May 19, 1970

G. C. WARD

3,512,271

MECHANICAL DEVICE FOR REPRESENTING MATHEMATICAL AND
PHYSICAL VALUES AND RELATIONSHIPS

Filed June 28, 1968

INVENTOR.

GERALD C. WARD

BY *Kegan, Kegan & Berkman*

May 19, 1970   G. C. WARD   3,512,271
MECHANICAL DEVICE FOR REPRESENTING MATHEMATICAL AND
PHYSICAL VALUES AND RELATIONSHIPS
Filed June 28, 1968   11 Sheets-Sheet 9

INVENTOR.
GERALD C. WARD
BY Kegan, Kegan & Berkman
ATTYS

May 19, 1970  G. C. WARD  3,512,271
MECHANICAL DEVICE FOR REPRESENTING MATHEMATICAL AND
PHYSICAL VALUES AND RELATIONSHIPS
Filed June 28, 1968  11 Sheets-Sheet 11

INVENTOR.
GERALD C. WARD

BY Kegan, Kegan & Berkman

ATTYS

United States Patent Office 3,512,271
Patented May 19, 1970

3,512,271
MECHANICAL DEVICE FOR REPRESENTING MATHEMATICAL AND PHYSICAL VALUES AND RELATIONSHIPS
Gerald C. Ward, Wilmette, Ill., assignor to Northwestern University, Evanston, Ill., a corporation of Illinois
Filed June 28, 1968, Ser. No. 741,015
Int. Cl. G09b 23/00
U.S. Cl. 35—10    3 Claims

ABSTRACT OF THE DISCLOSURE

A mechanism for producing mechanically a representation of mathematical and physical values, including relationships of stresses at a point in a body of material, strains at a point in a body of material, least moment of inertia of an area, and other mathematical and physical phenomena which can be expressed by a similar circular analogy. The mechanism comprises a rotatable reference element, means for orienting said reference element with respect to Mohr's circle, a rotatable cam, and first and second value indicator means which undergo changes in duo-harmonic mode with respect to rotation of said reference element.

---

This invention is a machine for presenting mechanically the relations between normal and shear values upon an infinitesimal two dimensional element located at a selected point in a body of material subject to external loads.

Persons studying the subject of mechanics of materials, strength of materials, resistance of materials, mechanics of deformable bodies, or similar names for the same subject, study the problem of stress at a point. This study usually begins by considering the state of stress which exists on the faces of an infinitesimally small cubic element at a selected location and orientation within a body of material under the action of external forces applied to the body. Mathematical expressions are developed to represent the relationships between the components of this state of stress and those which come into play in other random angular positions in which the element may be reoriented.

The problem is usually reduced to two dimensions, and the mathematical expressions are manipulated to yield the magnitudes and directions of the maximum and minimum normal stresses on the faces of the element and the maximum shear stresses which occur at this point in a body.

The mathematical procedure, while precise, is cumbersome and readily subject to error. Similar but less precise results can be obtained by a graphical method known as Mohr's Circle.

The general description of the device is a box or reference element simulating the two dimensional infinitesimal element mounted so that it can be placed in any angular position by rotating it about its short axis. Within the box, and in the base upon which it is mounted, are mechanisms which cause colored plastic arrows or indicators bearing scales to project from or retract into the sides of the box or reference element as the box is rotated. The exposure to view of these arrows in any rotational position represents the values, directions and sense of the stresses described by the equations:

$$\sigma_\theta = \frac{\sigma_x + \sigma_y}{2} = \frac{\sigma_x - \sigma_y}{2} \cos 2\theta - \tau_{xy} \sin 2\theta$$

$$\tau_\theta = \frac{\sigma_x - \sigma_y}{2} \sin 2\theta + \tau_{xy} \cos 2\theta$$

wherein the angle $\theta$ represents the rotation of the element measured from the X–Y position, $\sigma$ represents normal stress values and $\tau$ represents shear-stress values.

Immediately behind the box or element is mounted a clear plastic disk which can be rotated freely about its center in a plane parallel to the plane of the box and independently of it. Rotation of this circle causes the internal mechanisms to orient themselves so that a selected state of stress can be represented and studied.

The device is suspended vertically from a pair of hangers which travel along a rail attached to the top of a chalkboard. Coordinate axes are drawn on the chalkboard for use in plotting Mohr's Circle.

Other and further objects and advantages of the invention will become apparent from a reading of the following specification taken in conjunction with the drawings in which.

Figure 12:
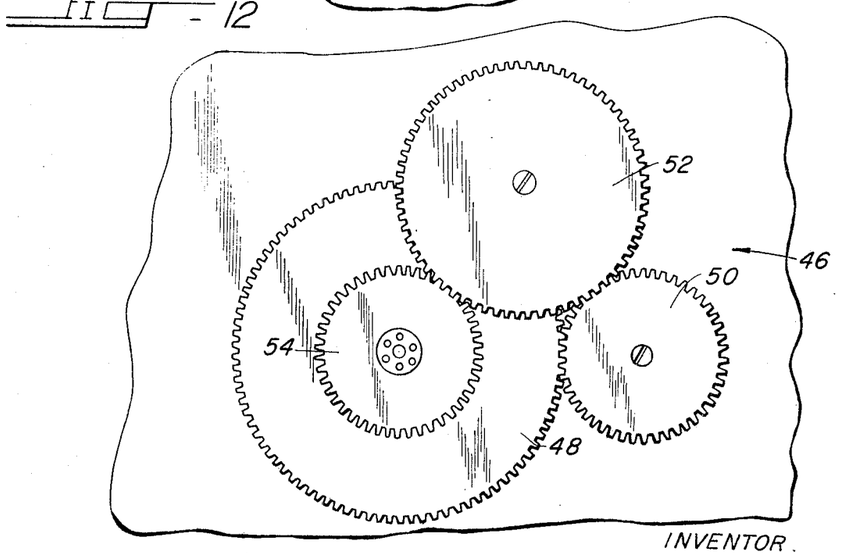
FIG. 12 is a top plan view of the bottom plate of the base showing the gear train which links the plastic disk to the rotatable sub-base.

Referring more specifically to the drawings, FIGS. 1, 2, 3 and 4 show an embodiment of the invention comprising a base 30, and a plastic disk 32 surmounting the base and rotatable about its axis. Surmounting the disk 32 is a sub-base 34 comprising a metal disk which is rotatable about a common axis with the disk 32. A box or reference element 36 having a removable top 38, side walls 40, a floor 42, and support means 44 is rotatably mounted above the sub-base 34 on the same axis as is the sub-base 34. Inside the base 30 is a gear train 46 comprising gears 48, 50, 52 and 54. As shown in FIG. 12, this gear train 46 couples the plastic disk 32 to the sub-base 34 so that when the disk 32 is rotated, the sub-base 34 rotates in the opposite direction at a rate of one-half an angular displacement of the disk 32. Gear 48 is connected directly to a driving shaft 50 on which the sub-base 34 is mounted. Gear 54 is connected directly to the disk 32. Thus, when the disk 32 is rotated, the driving shaft 50 will rotate the sub-base 34 in the opposite direction at one-half the rate of rotation. The rotatable disk 32 and sub-base 34 constitute orienting means for orienting the reference element 36.

Figure 11:
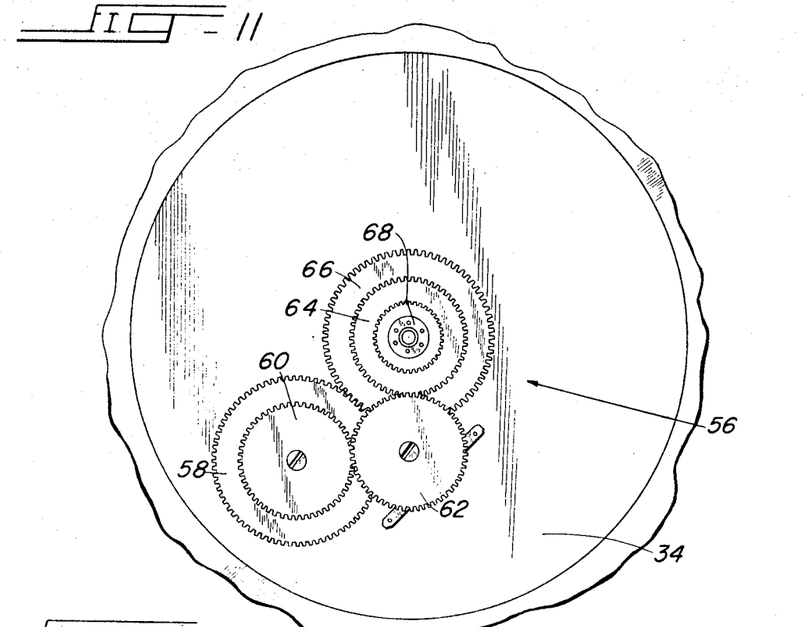
FIG. 11 is a top plan view of the rotatable sub-base and the gear train for driving the cam.

Mounted on the sub-base 34 is a second gear train 56 comprising gears 58, 60, 62 and 64 and 66 as shown in detail in FIG. 11. Gears 58 and 60 are fastened together to turn simultaneously. Gear 62 serves to couple gear 64 to gear 60. Gear 64 is affixed to the bottom of the floor 42 of the box or reference element 36. As the reference element 36 is turned manually, gear 64 drives gear 62 which drives gears 60 and 58. Gear 58 drives gear 66 to which is affixed a hub 68. Gear train 56 operates to connect the sub-base 34 to the hub 58 so that when the box 36 is manually rotated with respect to the other components the hub 68 rotates in an opposite direction at an equal rate of rotation. Thus, it will be seen that as the box or element 36 is rotated 360° with respect to the sub-base 34, the hub 68 rotates in the opposite direction 720° with respect to the box 36.

Figure 6:
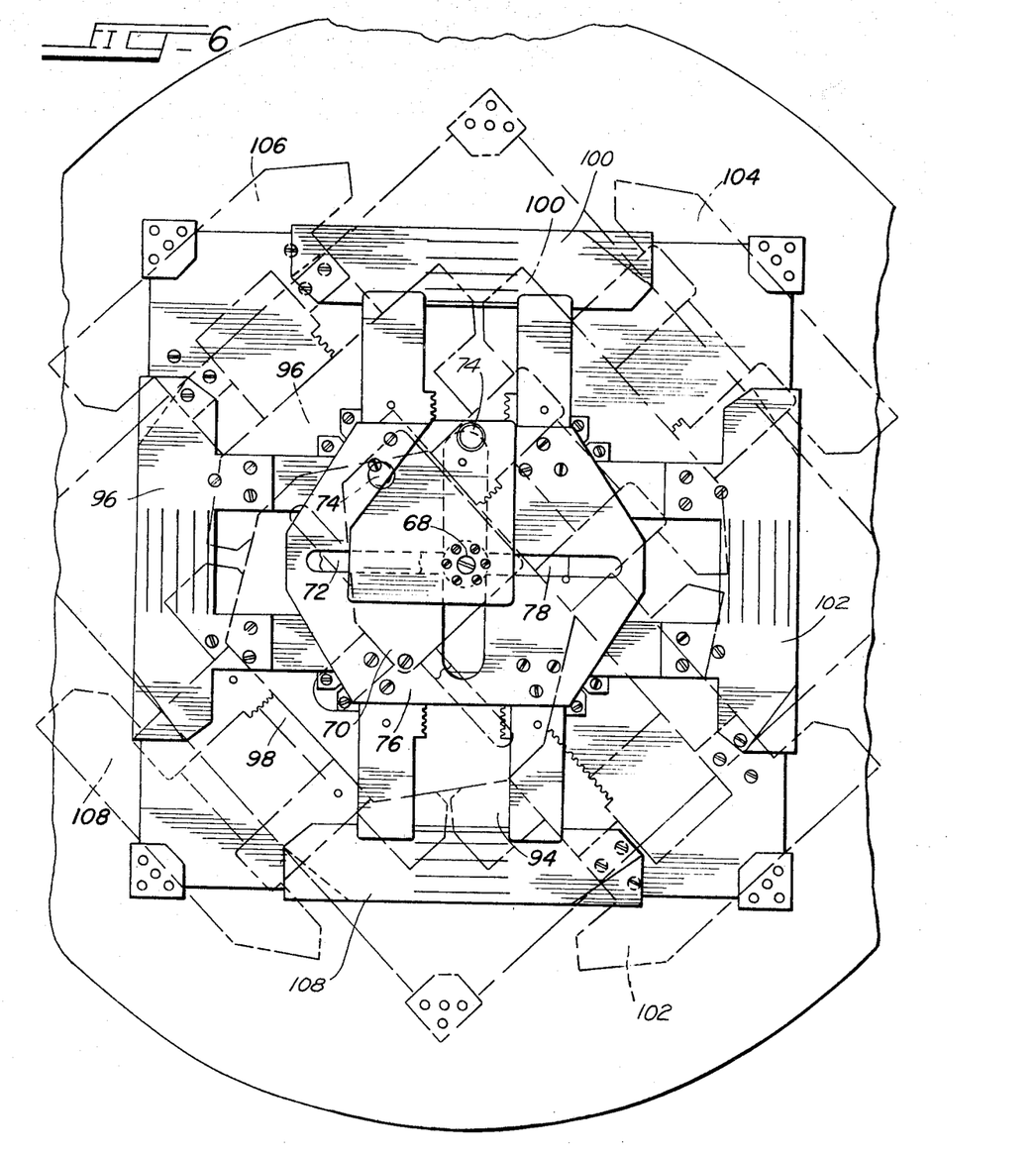
FIG. 6 is a top plan view showing the shear indicators of the device in two different positions.
Figure 8:
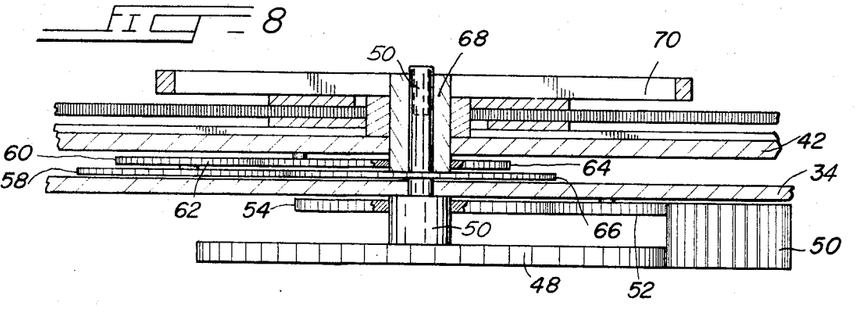
FIG. 8 is a front elevational cross sectional view showing the driving mechanism of the device.
Figure 9:
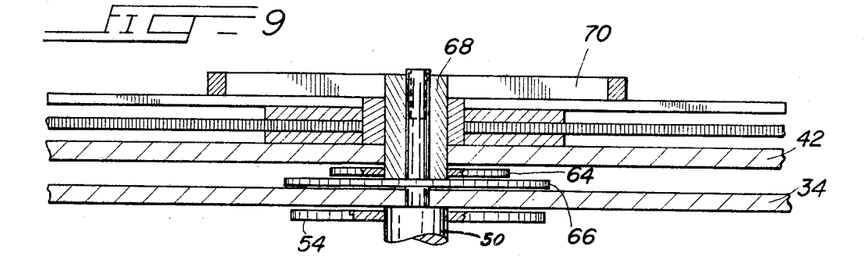
FIG. 9 is a side elevational cross section view showing a portion of the driving mechanism of the device.

Mounted eccentrically on the hub 68 and affixed thereto is a cam 70 shown in FIG. 6. As the hub 68 rotates the cam 70 rotates with it. On the bottom side of the cam 70 is mounted, away from the hub 68, a shear stress pin 72. On the upper side of the cam 70 is mounted, away from the hub 68, a normal stress pin 74. The locations and nature of these pins 72 and 74 are best seen when viewed in conjunction with FIG. 8. The shear stress pin 72 and the normal stress pin 74 are located on the cam 70 at a 90° angle with respect to the axis or hub 68.

Below the cam 70 within the box or element 36 is a shear stress yoke 76 provided with a transverse slot 78 which is shown in FIG. 6. The shear stress pin 72 engages the slot 78 in the shear stress yoke 76 which slides laterally as a Scotch yoke to produce duo-harmonic motion with respect to rotation of the cam 70.

Figure 10:
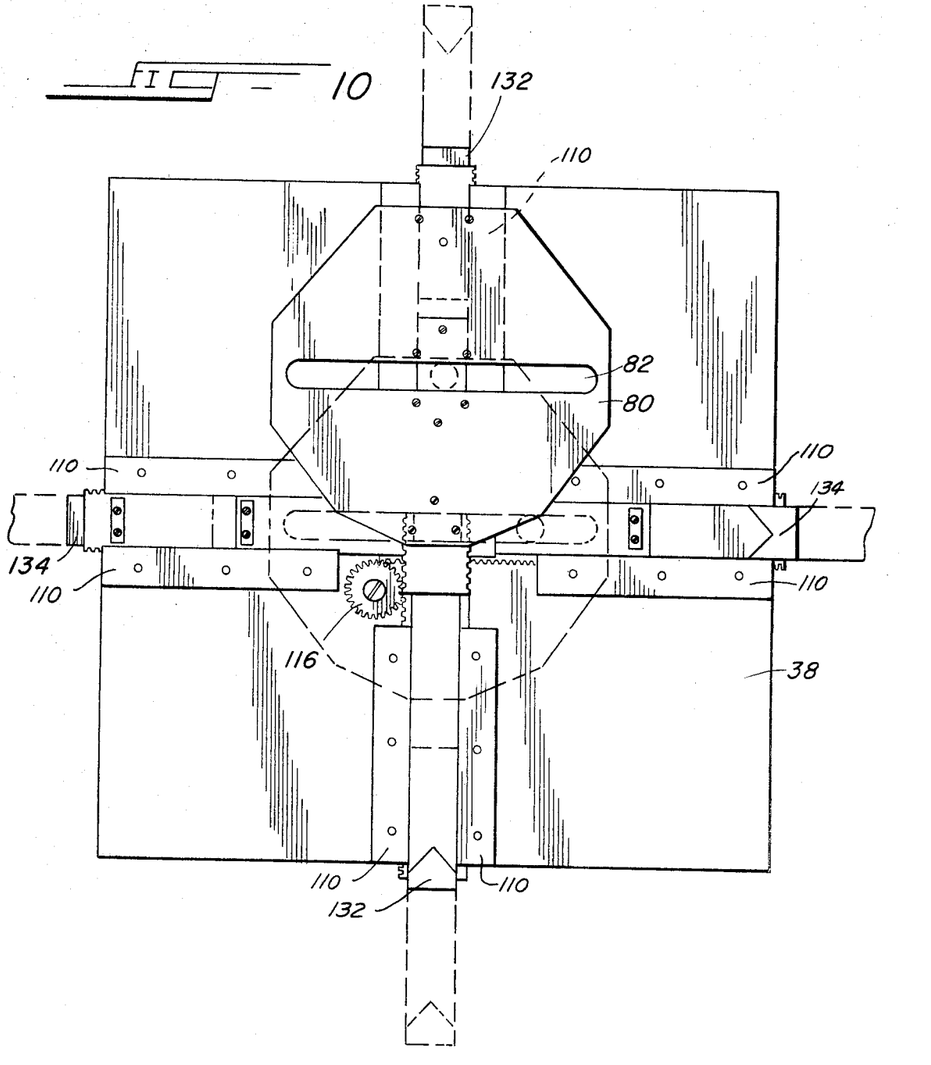
FIG. 10 is a bottom plan view of the box lid showing the normal stress indicators and the driving and coordinating mechanism therefor.

Above the cam 70 within the box or element 36 is a normal stress yoke 80, as shown in FIG. 10, having a slot 82. The normal stress pin 74 engages the slot 82 of the normal stress yoke 80, and as the cam 70 rotates, slides the normal stress yoke laterally to produce duo-harmonic motion with respect to the cam 70.

Figure 7:
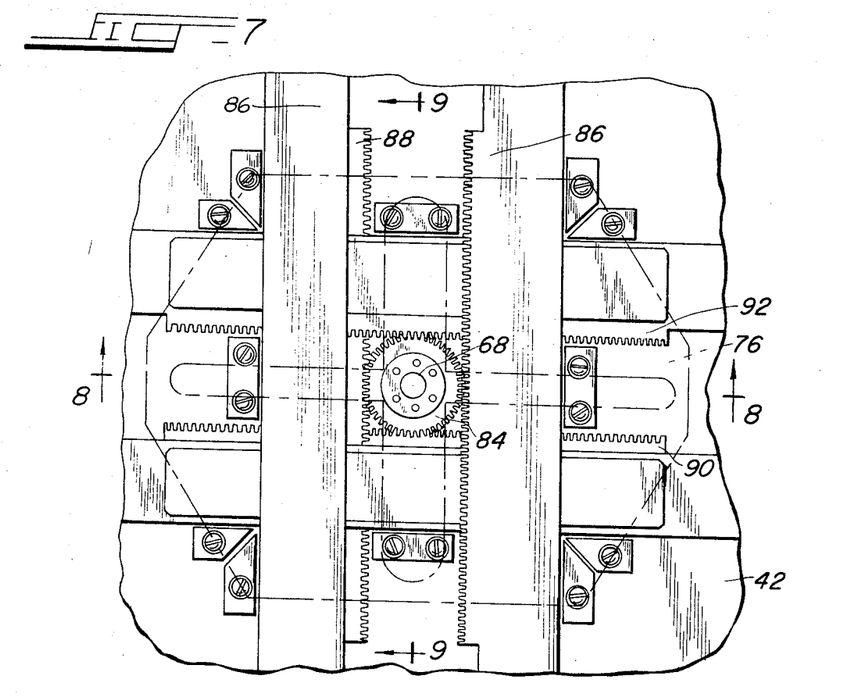
FIG. 7 is a top plan view showing the gear and rack mechanism for driving and coordinating the shear stress indicators.

As shown in FIG. 7, a free turning gear 84 is mounted on the hub 68 above the floor 42 of the box or reference element 36. A set of four shear stress racks 86, 88, 90 and 92 are stacked at successive right angles to each other, having a common center around said free turning gear 84. Shear stress rack 86, being the uppermost of the set is attached to the shear stress yoke 76 which moves linearly in duo-harmonic motion with the shear stress pin 72. The linear oscillatory movement of shear stress rack 84 causes an equal movement of shear stress rack 88 in an opposite direction. Similarly, shear stress racks 90 and 92 move linearly in opposite directions, being driven by the free turning gear 90.

Figure 1:
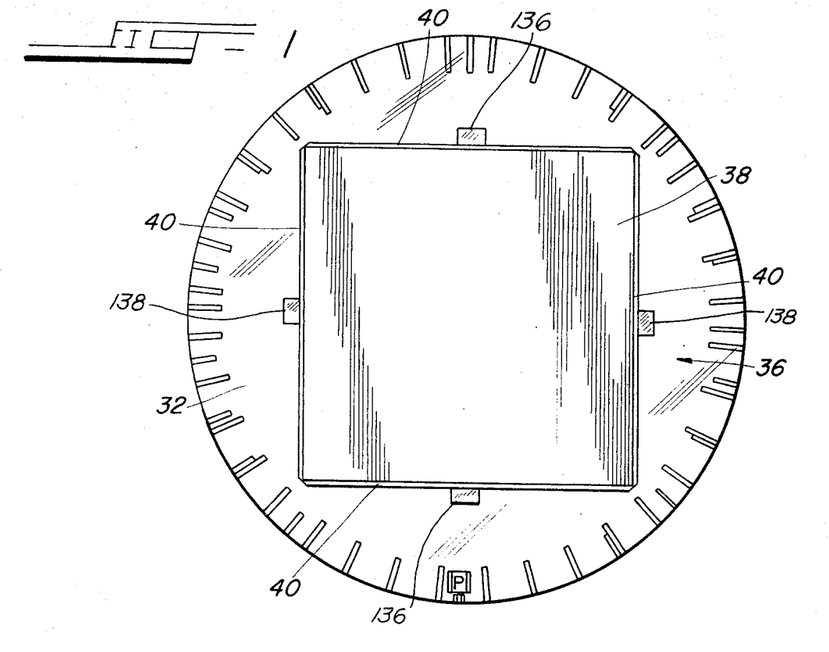
FIG. 1 is an overhead view of the device which is the subject of the invention.
Figure 2:
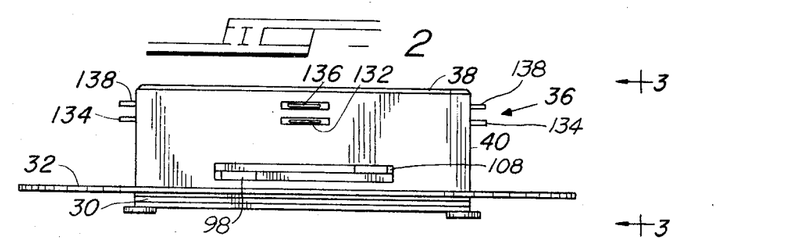
FIG. 2 is a front elevational view of the device.
Figure 3:
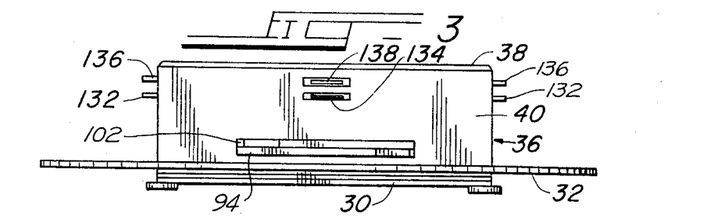
FIG. 3 is a side elevational view of the device.
Figure 4:
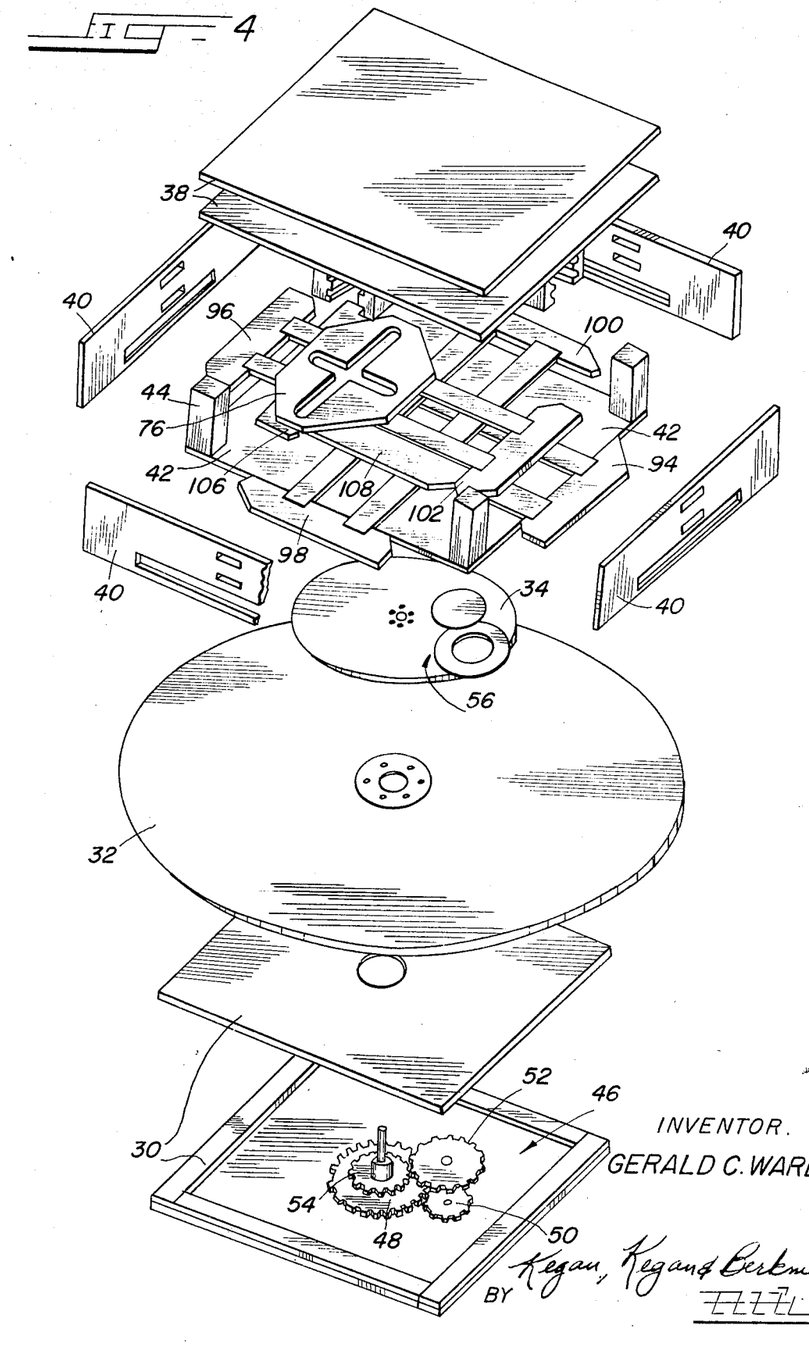
FIG. 4 is an exploded perspective view of the device showing the interrelationship of its component parts.
Figure 5:
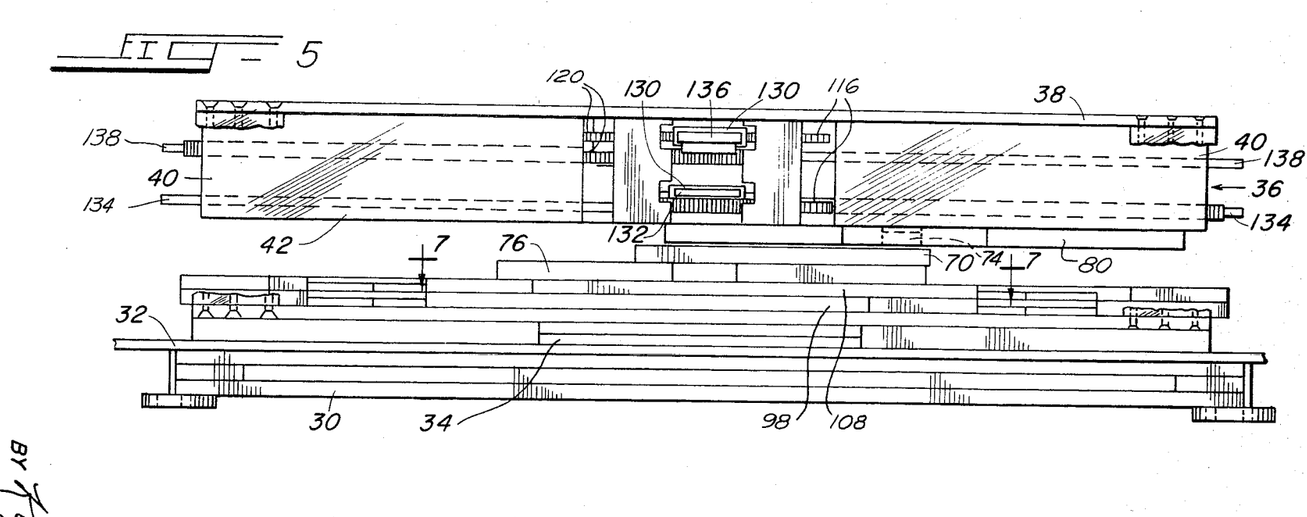
FIG. 5 is a side elevational view of the device.

At one end of each shear stress rack 86, 88 and 90 and 92 are positive red shear stress indicators 94, 96, 98 and 100, shown in FIG. 4. At the other end of each shear stress rack 86, 88, 90 and 92 are negative blue shear stress indicators 102, 104, 106 and 108. The signs or colors of the shear stress indicators are arranged so that the indicator projecting from the element 36 at any given position is an opposite sign or color of the indicator projecting from the side of the element 90° therefrom.

Figure 13:
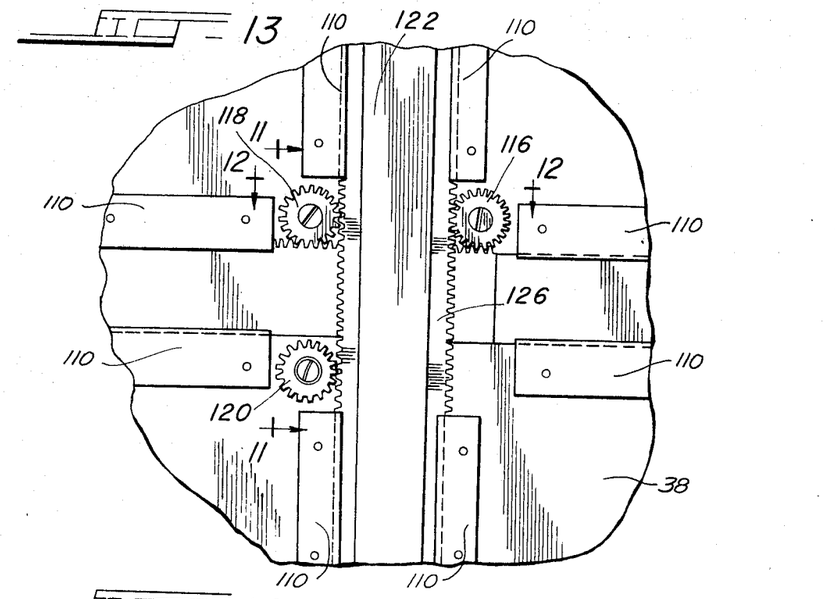
FIG. 13 is a bottom plan view of the lid of the box or reference element showing the gears and racks for drawing the normal stress indicators.
Figure 14:
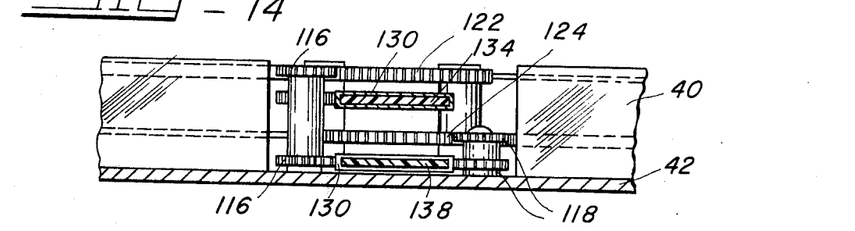
FIG. 14 is a front elevational view of the normal stress indicators and the mounts and driving mechanism therefor.
Figure 15:
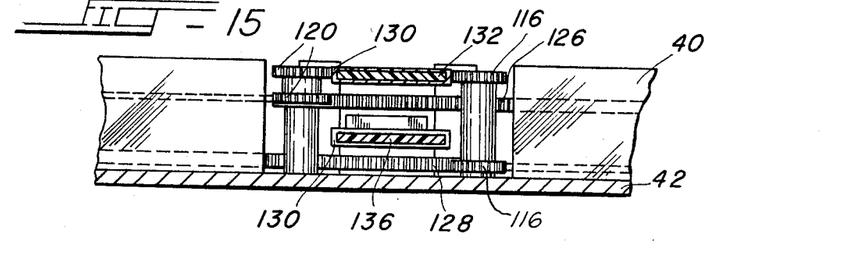
FIG. 15 is an elevational view of the normal stress indicators and the mounts therefor taken at a side of the box or reference element adjacent to that of FIG. 13.
Figure 16:
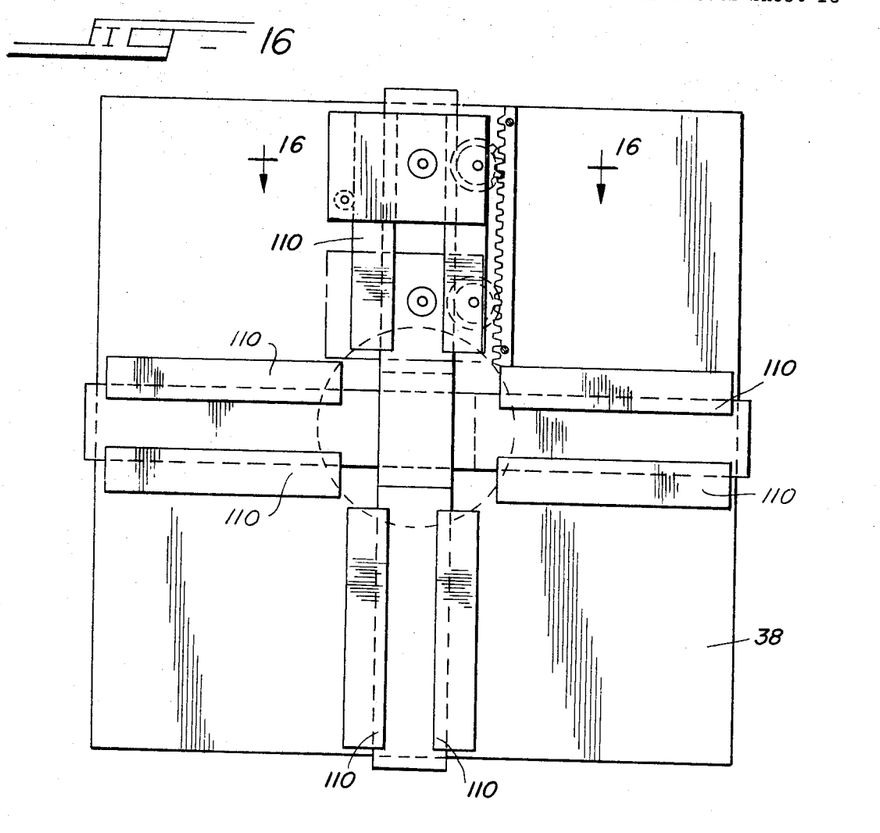
FIG. 16 is a bottom plan view showing the construction of the tracks in which the normal stress indicators ride.
Figure 17:
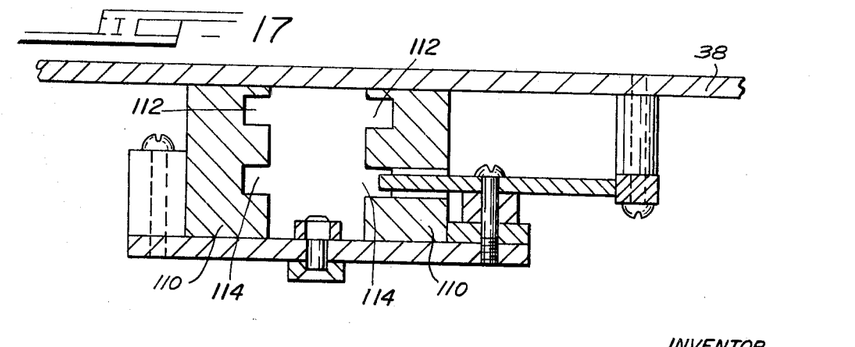
FIG. 17 is a cross sectional view of one of said tracks.

As shown in FIGS. 14, 15, 16 and 17 there are mounted on the underside of the top 38 of the box 36 tracks 110 cross section of the tracks 110 is shown in FIG. 17 showing four sets of slots 112, 113, 114 and 115 formed in the tracks. As shown in FIGS. 13, 14 and 15, there are situated at 3 inner ends of the tracks 110 gear 116, 118 and 120. A set of four normal stress racks 122, 124, 126 and 128 slide in the slots 112 and 114. The normal stress yoke 80 is attached to the lowermost normal stress rack 122 which is moved linearly by the motion of the yoke 80. By means of the gears 116, 118 and 120, normal stress racks 124, 126 and 128 are driven in linear motion corresponding with that of rack 122. When rack 122 is driven in one direction by the yoke 80, rack 124 is driven an equal distance in the opposite direction, and racks 126 and 128 are driven in opposite directions at right angles to racks 122 and 124.

The normal stress racks 122, 124, 126 and 128 are each provided with indicator accommodating slots 130 in the nature of telescopic mounts in each of which is inserted a normal stress arrow or indicator 132, 134, 136 and 138. One end of each normal stress indicator is red or positive, the other end is blue or negative, and each end is provided with markings or calibrations. The signs or colors of the normal stress indicators are arranged so that the indicator projecting from the box or reference element 36 at any given position is of an opposite sign or color of the indicator projecting from the side of the element 90° therefrom. Each of the normal stress indicators may be adjusted within their telescopic mounts or slots 130 to expose a given length of the negative or positive end of each of the normal stress indicators 132, 134, 136, 138.

Figure 18:
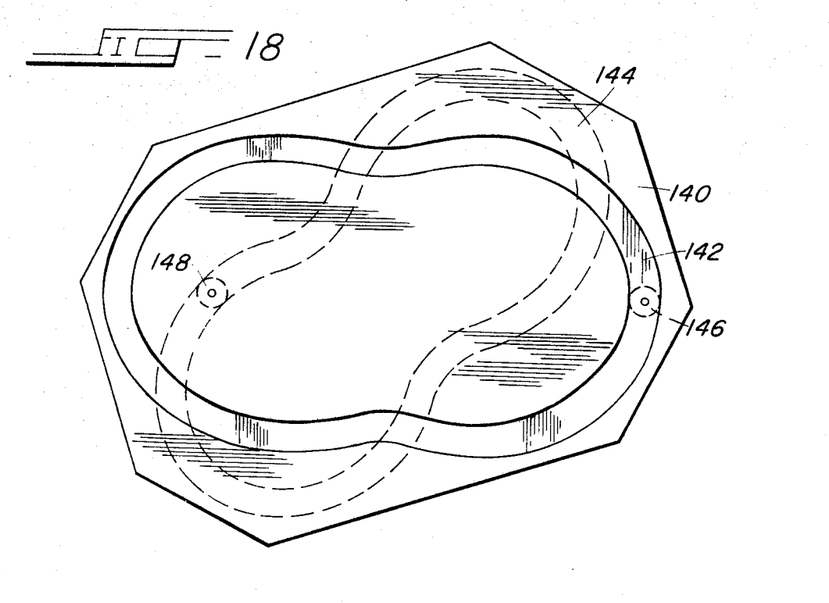
FIG. 18 is a cam and cam follower as an alternative device for creating duo-harmonic motion.

While the embodiment of the device heretofore described uses a Scotch yoke arrangement to create duo-harmonic motion for moving the stress indicators, an alternate mechanism would substitute a cam for the Scotch yoke mechanism. Referring to FIG. 18 there is shown an alternative cam plate 140 to be substituted for the cam plate 70. The cam plate 140 has a groove 142 with a rectangular cross section routed into its top surface and another rectangular groove 144 routed into its bottom surface. The shape of the upper groove 142 is calculated by the formula:

$$Y = 3.5 \cos 2\theta$$

where Y is the distance in inches from the center of the cam plate 140 to any point on the center line of the upper groove 142 at an angle $\theta$ measured from the long axis of the figure. The shape of the lower groove 144 is calculated by the formula:

$$Y = 2.0 + 1.5 \cos 2\theta$$

A first groove riding pin 146 is attached to the lowermost normal stress indicator 132 and engages the upper or first groove 142. A second groove riding pin 148 is attached to the uppermost shear stress indicator 102 and engages the lower or second groove 144. As the reference element 36 containing the stress indicators is rotated, the first and second groove riding pins 146 and 148 follow the paths of their respective grooves 142 and 144, thereby extending the stress indicators in and out of the box or reference element 36 in duo-harmonic mode with respect to rotation of the reference element 36.

Figure 19:
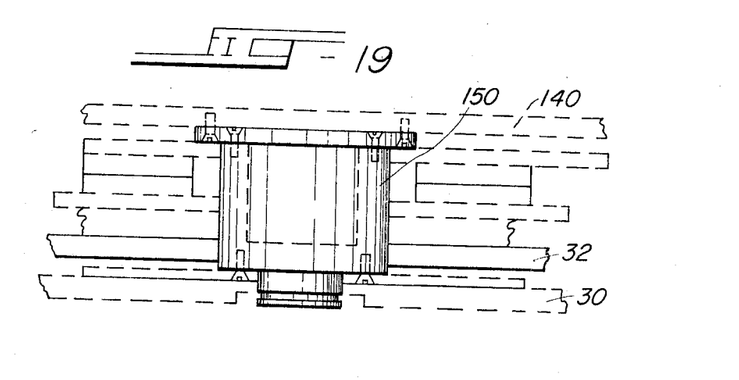
FIG. 19 is a side elevational view of said cam follower riding within grooves cut in said cam.

The cam 140 is mounted on a pedestal 150 which is attached to the disk or orienting means 32 of the device as is shown in FIG. 19. The disk 32 is rotated to orient the pedestal 150, cam 140 and the reference element 36 in a selected position. The reference element 36 is then rotated to a given angle. The values and directions of normal stress and shear stress are indicated by the normal stress indicatorfs 94, 96, 98, and 100, and the shear stress indicators 102, 104, 106 and 108. This second embodiment of the invention eliminates the need for the gear train assemblies 46 and 56 and the rotatable sub-base 34 used in the first embodiment.

While this invention has been described in connection with two preferred embodiment, it is to be understood that the description is illustrative only and is not intended to limit the invention, the scope of which is defined by the appended claims.

What is claimed is:
1. A device for producing mechanically a representation of mathematical and physical values, said values including relationships of stresses at a point, strains at a point in a body of material, least moment of inertia of an area, and other mathematical and physical phenomona which can be expressed by a similar circular analogy, said device comprising;
  a rotatable reference element;
  rotatable orienting means for orienting said reference element;
  a rotatable cam;
  first driving means intercoupling said orienting means with said cam for rotating said cam in a direction opposite rotation of said orienting means at an angular velocity equal to that of said orienting means;
  second driving means intercoupling said reference element with said cam for rotating said cam in a direction opposite rotation of said reference element at an angular velocity equal to that of said reference element;
  first and second value indicator means; and
  first and second coupling means for intercoupling said first and second value indicator means respectively to said cam to move said first and second value indicator means in duo-harmonic motion with respect to rotation of said cam;
  whereby said first and second value indicator means undergo changes in a duo-harmonic mode with respect to rotation of said reference element.
2. The structure set forth in claim 1 wherein said first and second coupling means are pins extending outwardly from opposed faces to said cam and spaced 90° from each other, and further comprising;
  first and second Scotch yokes coupled to said first and second value indicator means respectively and disposed adjacent opposed faces of said cam;
  said first and second Scotch yokes each consisting of a plate having formed therein an elongated coupling-means-receiving slot extending transversely of a line of travel of said yoke;
  whereby said Scotch yokes are moved laterally in duo-harmonic mode with respect to rotation of said cam.
3. The structure set forth in claim 1 wherein said cam has formed in opposed faces first and second coupling-means-receiving grooves,
  said first coupling-means-receiving groove being shaped according to a formula

$$Y = K \cos 2\theta$$

where K is equal to or greater than 2.5
  said second coupling means receiving groove being shaped according to a formula $$Y = A + B \cos 2\theta$$

where A is equal to or greater than 1.0,
where B is equal to or greater than 1.0,
where Y is the distance in inches from a center point of said cam to any point on a center line of either said groove; and where $\theta$ is an angle measured from the long axis of the groove;
wherein said first and second coupling means are first and second groove-riding pins coupled to said first and second value indicator means respectively.

References Cited
UNITED STATES PATENTS 3,032,893   5/1962   Debah ______________ 35—34 X

FOREIGN PATENTS 1,459,698   10/1966   France.

WILLIAM H. GRIEB, Primary Examiner

U.S. Cl. X.R.

35—30; 235—61